(12) United States Patent
Sasaki

(10) Patent No.: US 9,183,811 B2
(45) Date of Patent: Nov. 10, 2015

(54) METHOD OF CORRECTING UNEVENNESS OF DISPLAY PANEL AND CORRECTION SYSTEM

(75) Inventor: Takashi Sasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 211 days.

(21) Appl. No.: 14/001,733

(22) PCT Filed: Apr. 2, 2012

(86) PCT No.: PCT/JP2012/058908
§ 371 (c)(1),
(2), (4) Date: Aug. 27, 2013

(87) PCT Pub. No.: WO2012/133890
PCT Pub. Date: Oct. 4, 2012

(65) Prior Publication Data
US 2013/0342558 A1 Dec. 26, 2013

(30) Foreign Application Priority Data
Apr. 1, 2011 (JP) .................................. 2011-081944

(51) Int. Cl.
*G09G 5/02* (2006.01)
*G06K 9/00* (2006.01)
(Continued)

(52) U.S. Cl.
CPC .................. *G09G 5/02* (2013.01); *G09G 3/006* (2013.01); *G02F 1/1309* (2013.01); *G02F 2201/58* (2013.01); *G09G 3/3648* (2013.01); *G09G 2320/0233* (2013.01);
(Continued)

(58) Field of Classification Search
CPC ............ G09G 5/02; G06T 5/001; G06T 5/40; H04N 5/57; H04N 9/68; G02B 7/36
USPC .................. 345/589–591, 600; 382/167, 274; 348/687, 645; 250/204
See application file for complete search history.

(56) References Cited

U.S. PATENT DOCUMENTS 5,793,344 A  8/1998  Koyama
6,549,183 B1  4/2003  Koyama
(Continued)

FOREIGN PATENT DOCUMENTS

JP  61-243495 A  10/1986
JP  04-31120 U  3/1992
(Continued)

OTHER PUBLICATIONS

Official Communication issued in International Patent Application No. PCT/JP2012/058908, mailed on May 15, 2012.

*Primary Examiner* — Phi Hoang
*Assistant Examiner* — Andrew Shin
(74) *Attorney, Agent, or Firm* — Keating & Bennett, LLP

(57) ABSTRACT

A process of correcting display unevenness of a liquid crystal panel 40 of the present invention includes following steps. (1) Supply image data to the liquid crystal panel 40 and display the liquid crystal panel 40. (2) Capture an image of a display area of the liquid crystal panel 44 with a camera 66. (3) Generate correction data for the liquid crystal panel based on a captured image result. (4) Store the correction data in a volatile storing device. (5) Generate corrected image data with using the correction data stored in the volatile storing device. (6) Supply the corrected image data to the liquid crystal panel and display the liquid crystal panel 40. (7) Executed repeatedly the processes from (2) to (6).

6 Claims, 13 Drawing Sheets

(51) Int. Cl.
  *G06K 9/40* (2006.01)
  *H04N 5/57* (2006.01)
  *H04N 9/68* (2006.01)
  *G01J 1/36* (2006.01)
  *G09G 3/00* (2006.01)
  *G02F 1/13* (2006.01)
  *G09G 3/36* (2006.01)

(52) U.S. Cl.
  CPC .............. *G09G 2320/0285* (2013.01); *G09G 2320/0693* (2013.01); *G09G 2360/145* (2013.01)

(56) References Cited

U.S. PATENT DOCUMENTS

| | | |
|---|---|---|
| 2003/0071804 A1 | 4/2003 | Yamazaki et al. |
| 2003/0193489 A1 | 10/2003 | Koyama |
| 2006/0103684 A1 | 5/2006 | Yamazaki et al. |
| 2006/0109231 A1 | 5/2006 | Koyama |
| 2007/0008251 A1* | 1/2007 | Kohno et al. .............. 345/76 |
| 2008/0062164 A1* | 3/2008 | Bassi et al. .............. 345/214 |
| 2011/0157115 A1* | 6/2011 | Shao et al. .............. 345/207 |
| 2012/0044222 A1* | 2/2012 | Jung et al. .............. 345/207 |

FOREIGN PATENT DOCUMENTS

| | | |
|---|---|---|
| JP | 07-261719 A | 10/1995 |
| JP | 2001-075542 A | 3/2001 |
| JP | 2001-290710 A | 10/2001 |
| JP | 2003-177714 A | 6/2003 |
| JP | 2009-168883 A | 7/2009 |
| JP | 2010-066352 A | 3/2010 |

* cited by examiner

FIG.10

| PROCESS | PROCESS TIME / SECONDS |
|---|---|
| CAPTURING IMAGE AND CALCULATION OF CORRECTION VALUE | 10 |
| WRITING IN AND READING FROM DRAM | 0.01 |
| CAPTUREING IMAGE AND CALCULATION OF CORRECTION VALUE | 10 |
| DELETING FROM AND WRITING IN DRAM | 0.01 |
| WRITING IN FLASH MEMORY | 2.6 |
| TOTAL OF TWO CYCLES | 22.62 |
| AFTER SECOND CYCLE | 10.01 |

FIG.11

| PROCESS | PROCESS TIME / SECONDS |
|---|---|
| CAPTURING IMAGE AND CALCULATION OF CORRECTION VALUE | 10 |
| WRITING IN FLASH MEMORY | 2.6 |
| READING FROM FLASH MEMORY | 3 |
| CAPTURING IMAGE AND CALCULATION OF CORRECTION VALUE | 10 |
| DELETE DATA FROM FLASH MEMORY | 12 |
| WRITE DATA IN FLASH MEMORY | 2.6 |
| TOTAL OF TWO CYCLES | 40.2 |
| AFTER SECOND CYCLE | 27.6 |

METHOD OF CORRECTING UNEVENNESS OF DISPLAY PANEL AND CORRECTION SYSTEM

TECHNICAL FIELD

The present invention relates to a method of correcting unevenness of a display panel and a correction system, and especially relates to a technology of correcting display unevenness of a display panel.

BACKGROUND ART

A high quality display device such as a large screen television is widely used. In such a display device, unevenness in brightness and color occurring in a display image (referred to as display unevenness including unevenness in brightness and color) greatly affects image quality. Therefore, display unevenness is necessary to be corrected effectively.

A technology of correcting display unevenness has been disclosed (for example, Patent Document 1). In a correction device of a related art, an image displayed on the display panel is captured by an image capturing device. Correction data is generated based on the captured result and the correction data is written in a non-volatile storing device. In correcting the image data, the correction data is read from the non-volatile storing device of the correction device and the image data is corrected with using the correction data.

Patent Document 1: Japanese Unexamined Patent Application Publication No. 2001-75542

PROBLEM TO BE SOLVED BY THE INVENTION

Even if the correction data is generated based on a result of the captured display panel for which the correction data is used, precision of the correction data may be deteriorated due to a noise caused in the capturing, a calculation error occurring in generating the correction data, or data compression in generating the correction data. To improve the precision of the correction data, it is effective to generate correction data repeatedly, for example, to capture the display panel with using the correction data and generate correction data based on the captured image data. However, if the correction data is written in the non-volatile storing device, relatively long time is required to delete or write the correction data. Therefore, it is difficult to generate correction data repeatedly.

DISCLOSURE OF THE PRESENT INVENTION

The present invention was accomplished in view of the foregoing circumstances. An object of the present invention is to shorten a time required for correcting unevenness of a display panel.

Means for Solving the Problem

To solve the above problem, according to the present invention, a method of correcting display unevenness of a display panel includes a supplying process of supplying image data to the display panel and display the display panel, an image capturing process of capturing an image of a display area of the displaying display panel, a generating process of generating correction data for the display panel based on a captured image result obtained in the image capturing process, a storing process of storing the correction data in a volatile storing device, a correcting process of correcting the image data with using the correction data stored in the volatile storing device and generating corrected image data, a re-supplying process of supplying the corrected image data to the display panel to display again the display panel, and a repeating process of executing repeatedly processes from the image capturing process to the re-supplying process.

According to the method of correcting unevenness of the display panel, the processes from the image capturing process to the re-supplying process are executed repeatedly and thus obtained correction data is stored in the volatile storing device. According to the method of driving the display panel, the volatile storing device is used as a storing device storing correction data. Therefore, time for writing the correction data into the storing device or time for deleting the correction data from the storing device is shortened compared to using a non-volatile storing device for the storing device. Therefore, even if the processes from the image capturing process to the re-supplying process are executed repeatedly and deleting or writing of the correction data is executed repeatedly, time required for correcting unevenness of the display panel is shortened.

In the generating process included in the repeating process, first correction data may be generated based on the captured image result obtained in the capturing process in the repeating process, and second correction data may be correction data generated in a previous generating process, and the first correction data and the second correction data may be added to generate the correction data. Accordingly, the correction data is generated with the correction processes executed repeatedly several times and a plurality of correction data is added to generate correction data of high precision. With such correction data, the display unevenness is corrected precisely.

The image data may have same brightness and same chromaticity information over an entire display area of the display panel. The generation circuit may generate the first correction data such that variation of the captured image result is within a predetermined range. Accordingly, the first correction data is generated such that variation of the captured image result in displaying a gradation solid pattern, for example, is within the predetermined range that is determined with reference to human beings' visual perception. Accordingly, the display unevenness is precisely corrected.

The method may further include a determination process of determining whether the repeating process is executed or not. In such a case, the determination process may be executed after execution of the repeating process and prior to next execution of the repeating process.

The method of correcting unevenness of the display panel may include the determination process of determining whether the repeating process is executed or not. Therefore, if effective corrected image data is generated by one repeating process, or if the display unevenness is precisely corrected with using the corrected image data generated by one repeating process, the repeating process is not necessarily executed twice or three times. This shortens time required for correcting unevenness of the display panel.

The determination process may include the image capturing process, and if variation of the captured image result obtained in the image capturing process is within the predetermined range, it may be determined not to execute the repeating process in the determination process, and if variation of the captured image result obtained in the image capturing process is greater than the predetermined range, it may be determined to execute the repeating process in the determination process. If the repeating process is executed after the determination process, the image capturing process included in the determination process may be common to the image capturing process included in the repeating process.

According to the method of correcting unevenness of the display panel, if it is determined that the variation of the captured image result is greater than the predetermined range in the determination process and the repeating process is executed after the determination process, the same image capturing process is not executed twice in the determination process and the repeating process. This shortens time required for correcting unevenness of the display panel.

The supplying process may be executed with using a liquid crystal panel using liquid crystals. With this configuration, display unevenness is less likely to occur on the liquid crystal panel used in a large screen television.

The present invention may be applied to a correction system that achieves the method of correcting display unevenness. According to the present invention, a correction system for correcting display unevenness of a display panel includes a supplier configured to supply image data to the display panel and display the display panel, an image capturing device configured to capture an image of a display area of the display panel, a generator configured to generate correction data for the display panel based on a captured image result obtained by the image capturing device, a first storing device that is volatile and configured to store the correction data, a corrector configured to correct the image data with using the correction data stored in the storing device and generate corrected image data, and a controller configured to control each component so as to generate another correction data again based on a captured image result obtained when the corrected image data is supplied to the display panel to display the display panel and to generate another corrected image data based on the other correction data.

According to the display device, the generator generates the correction data and with using the generated correction data, the generator generates correction data again and generates corrected image data generated based on the correction data generated again. The generated corrected image data is displayed on the display panel. Namely, the corrected image data that is finally generated is obtained via correction operations of a plurality of times by the corrector. According to the correction system, since the volatile storing device is used as the storing device, time required for various operations is shortened compared to the non-volatile storing device. Therefore, even if the correction operation is executed by the corrector repeatedly, time required for correcting unevenness of the display panel is shortened.

The generator may input the generated correction data to the corrector, and the generator may input same correction data several times when inputting the correction data to the corrector. The corrector may determine whether the correction data input several times at different timing coincide with each other.

According to the correction system, the corrector to which the correction data is input determines whether the plurality of correction data that is input at different timing coincides with each other. Namely, a verifying operation is executed to determine non-coincidence of writing caused due to a transmission error. The correction system detects a transmission error caused in the data that is only input from an external device and not output to the external device such as the correction data for the corrector. Therefore, corrected image data is less likely to be generated with using correction data that is generated with occurrence of a transmission error, and display unevenness of the display panel is corrected precisely.

The generator may input the image data to the corrector via an input line and the generator may input the correction data to the corrector via the same input line. With this configuration, if the correction data is transmitted via the input line to which the data whose transmission direction is predetermined such as the image data is input, a transmission error is detected and display unevenness of the display panel is corrected precisely.

The corrector may be configured to be connected to an output line via which a determination result regarding the correction data is output. Accordingly, the determination result representing a result of determining the correction data by the corrector is read to outside of the corrector via the output line. The determination result is reflected to the processes of the correction system.

The output line may be commonly used as a supply line via which the corrected image data is supplied to the display panel. The corrector may have an identification mark representing the determination result and output the identification mark to the display panel according to the determination result. If it is determined that the captured image result includes an identification mark representing that the plurality of correction data does not coincide with each other, the generator may input the correction data to the corrector again.

According to the display device, the identification mark is displayed on the display panel to output the determination result of the correction data to outside of the corrector. The generator confirms the captured image that is input via the image capturing device. If it is determined that the captured image includes the identification mark representing that the plurality of correction data does not coincide with each other, the correction data is input to the corrector again. Accordingly, the corrected image data is less likely to be generated based on the correction data that is input at occurrence of a transmission error.

The generator may have a plurality of conversion patterns with which the correction data is converted. In inputting the same correction data to the corrector for a plurality of times, the generator may input the correction data that is converted with at least two of the conversion patterns to the corrector.

For example, if disconnection occurs in the input line as a transmission error, all the correction data input to the corrector including the correction data output from the generator is same, and the transmission error is not detected with using a plurality of correction data input to the corrector. According to the display device, when the generator inputs the correction data to the corrector, the generator converts the correction data with using a plurality of conversion patterns and the corrector makes determination with using a plurality of correction data that is converted with the conversion patterns. Therefore, if disconnection occurs in the input line, the same correction data is input to the corrector although the correction data is converted with the conversion patterns. Even in such a case, the occurrence of a transmission error is detected and this improves detection accuracy of detecting a transmission error.

The correction system may further include a second storing device that is non-volatile and configured to store the correction data. The controller may control the display to display the other corrected image data on the display panel and control the image capturing device to capture an image of the other corrected image data after generation of the other correction data and the other corrected image data and obtain a captured image result. If variation of the captured image result is greater than a predetermined range, the controller may control the generator and the corrector to generate an additional corrected image data based on the captured image result. If the variation of the captured image result is within the predetermined range, the other correction data may be input to the corrector several times.

According to the correction system, if the correction data is generated such that variation of the image captured result is within the predetermined range, the verifying operation is executed for the correction data. According to the correction system, a transmission error is less likely to occur in the correction data that is generated such that variation of the image captured result is within the predetermined range. Accordingly, display unevenness of the display panel is corrected precisely.

Advantageous Effects of the Invention

According to the present invention, time required for correcting unevenness of a display panel is shortened.

BRIEF DESCRIPTION OF THE DRAWINGS

FIG. 10 is a table illustrating required time according to the present embodiment.

FIG. 11 is a table illustrating required time according to a related art.

MODES FOR CARRYING OUT THE INVENTION

<First Embodiment>

A first embodiment will be explained with reference to the drawings. In the first embodiment, a liquid crystal display device including a liquid crystal panel will be described as an example. However, the present invention is not necessarily applied to such a liquid crystal display device but may be applied to a PDP (plasma display panel) display device or an active matrix type display device such as an organic EL (electro luminescence) display device.

1. Configuration of Correction System

Figure 1:
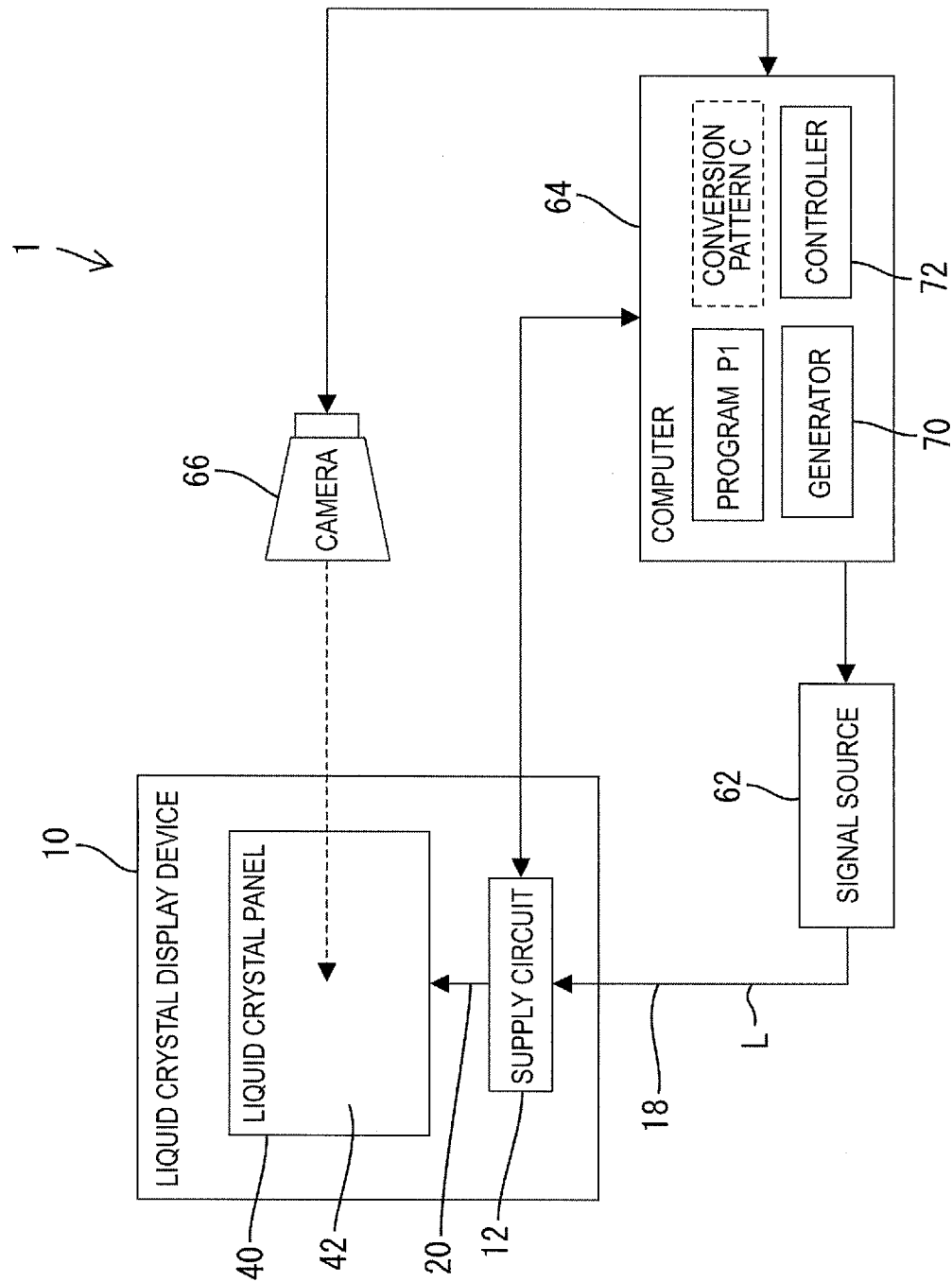
FIG. 1 is a view illustrating a general construction of a correction system 1.

A configuration of a correction system 1 that corrects display unevenness of a liquid crystal display device 10 will be explained with reference to FIG. 1. As illustrated in FIG. 1, the system 1 includes the liquid crystal display device 10, a signal source 62, a computer 64 and a camera (one of examples of an image capturing device) 66. The liquid crystal display device 10 includes a supply circuit 12 and a liquid crystal panel (one of examples of a display panel) 40, as will be described. The liquid crystal device 10 is connected to the signal source 62 via an input line 18. The supply circuit 12 supplies image data G that is transmitted from the signal source 62 to the liquid crystal panel 40 via a supply line 20 and displayed on a display area 42 of the liquid crystal panel 40. The camera 66 is arranged on a front side of the liquid crystal panel 40 and captures images of the display area 42 of the liquid crystal panel 40.

The computer 64 is connected to the signal source 62, the camera 66 and the supply circuit 12 of the liquid crystal display device 10. Various programs P1 for controlling each component of the correction system 1 are stored in the computer 64. The computer 64 functions as a controller 72 according to the program P1 and controls the signal source 62, the camera 66, the supply circuit 12 and the computer 64.

The computer 64 receives a captured image result W that is captured by the camera 66 and generates correction data H for the liquid crystal panel 40 based on the captured image result W. The computer 64 functions as a generator 70 that generates the correction data H based on the captured image result W. The computer 64 inputs the generated correction data H to the supply circuit 12. The computer 64 transmits the correction data H to the supply circuit 12 via the signal source 62. The image data G and the correction data H are transmitted to the supply circuit 12 via the same input line 18.

Figure 2:
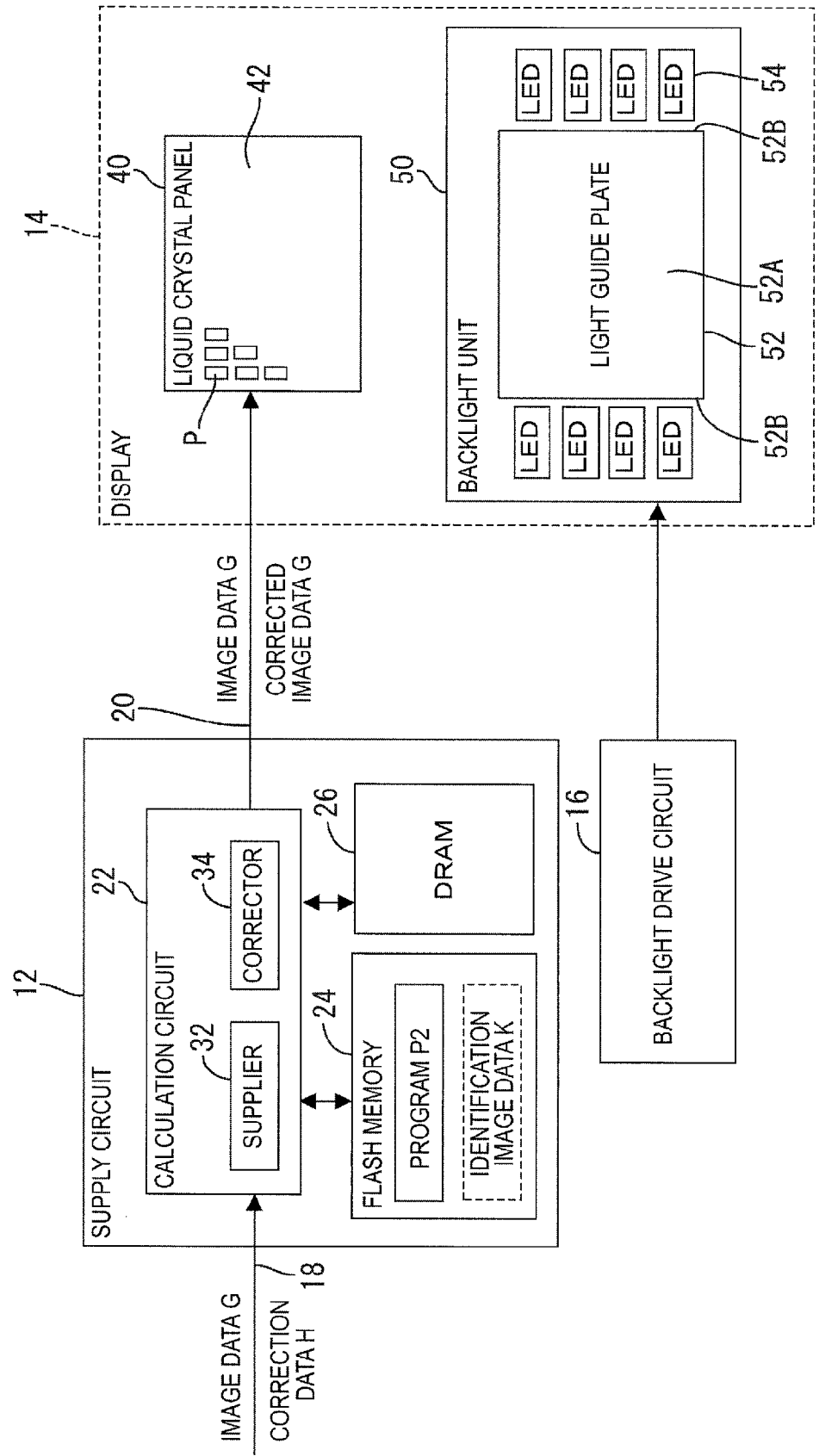
FIG. 2 is a view illustrating a general construction of a liquid crystal display device 10.
Figure 3:
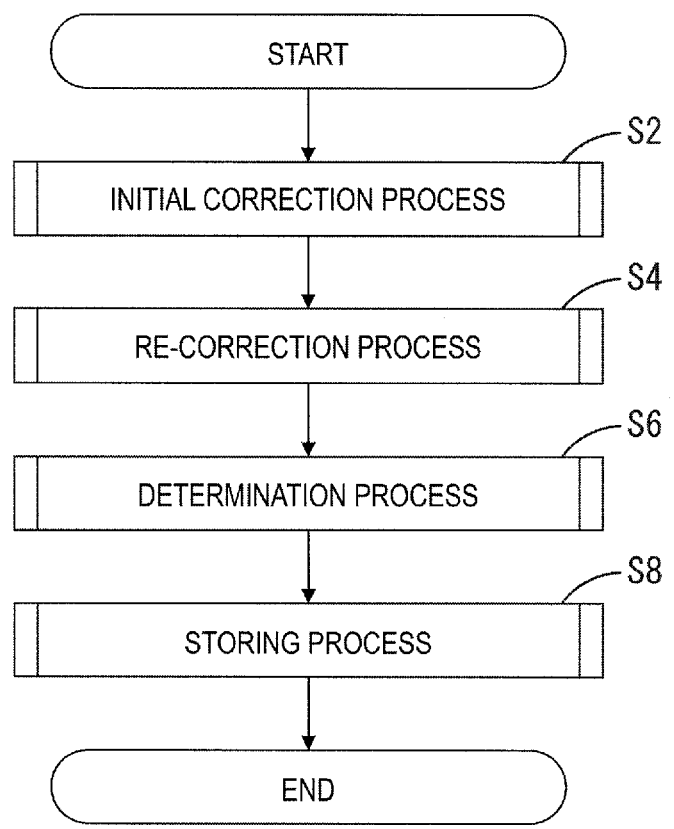
FIG. 3 is a flowchart illustrating a process of the correction system 1.

A configuration of the liquid crystal display device 10 is illustrated in FIG. 2. The liquid crystal display device 10 includes the supply circuit 12, a display 14, and a backlight drive circuit 16. The display 14 includes the liquid crystal panel 40 and a backlight unit 50.

The backlight unit 50 is arranged on a rear-surface side of the liquid crystal panel 40. The backlight unit 50 includes LEDs 54 (light emitting diodes) that are light sources and a light guide plate 52. The LEDs 54 are arranged to face each side surface of the light guide plate 52. The light guide plate 52 is arranged such that a main surface 52A thereof faces the liquid crystal panel 40. Light from the LEDs 54 enters the side surface 52B of the light guide plate 52 and is guided through the light guide plate 52 to the main surface 52A thereof facing the liquid crystal panel 40. Therefore, the side surface of the light guide plate 52 is a light entrance surface 52B through which the light from the LEDs 54 enters the light guide plate 52. The main surface of the light guide plate 52 is a light exit surface 52A from which the light traveling through the light guide plate 52 exits to the liquid crystal panel 40. Thus, the backlight unit 50 is a backlight unit of an edge-light type (a side-light type) that includes the LEDs 54 on each long-side edge and the light guide plate 52 in its middle portion.

The backlight drive circuit 16 is connected to the LEDs 54 that configure the backlight unit 50. The backlight drive circuit 16 supplies current to each of the LEDs 54 and controls a current amount supplied to each LED 54 to control an amount of light that enters the light guide plate 52 from each LED 54.

The supply circuit 12 includes a calculation circuit 22, a FLASH memory 24 and a DRAM (one of examples of a storing device) 26. The FLASH memory 24 is a non-volatile storing device, and stores various programs P2 that control operations of the calculation circuit 22. The calculation circuit 22 executes operations according to the program P2 read from the FLASH memory 24 or a command input from the computer 64. The DRAM 26 is a volatile storing device and stores correction data H transmitted from the computer 64.

The image data G is transmitted to the calculation circuit 22 from the signal source 62 and the calculation circuit 22 functions as a supplier 32 to supply the image data G to the liquid crystal display panel 40 and display the image on the liquid crystal panel 40. If the correction data H is stored in the DRAM 26, the calculation circuit 22 reads the correction data H from the DRAM 26 and corrects the image data G that is transmitted from the signal source 62, with using the correction data H. The calculation circuit 22 supplies the corrected image data G' to the liquid crystal panel 40. In such a case, the calculation circuit 22 functions as a corrector 34 that corrects the image data G with using the correction data H read from the DRAM 26 and generates the corrected image data G'.

2. Process of Correction System

With reference to FIGS. 3 to 9, a process of correcting display unevenness of the liquid crystal panel 40 executed by the correction system 1 will be explained. Prior to starting the process, the correction data H is deleted from the DRAM 26 of the supply circuit 12.

If a user sets the liquid crystal panel 40 or the liquid crystal display device 10 to configure the correction system 1, and if the user inputs a correction command for correcting the liquid crystal panel 40, the computer 64 starts processing. In starting the processing, the computer 64 executes an initial correction process (S2).

(Initial Correction Process)

Figure 4:
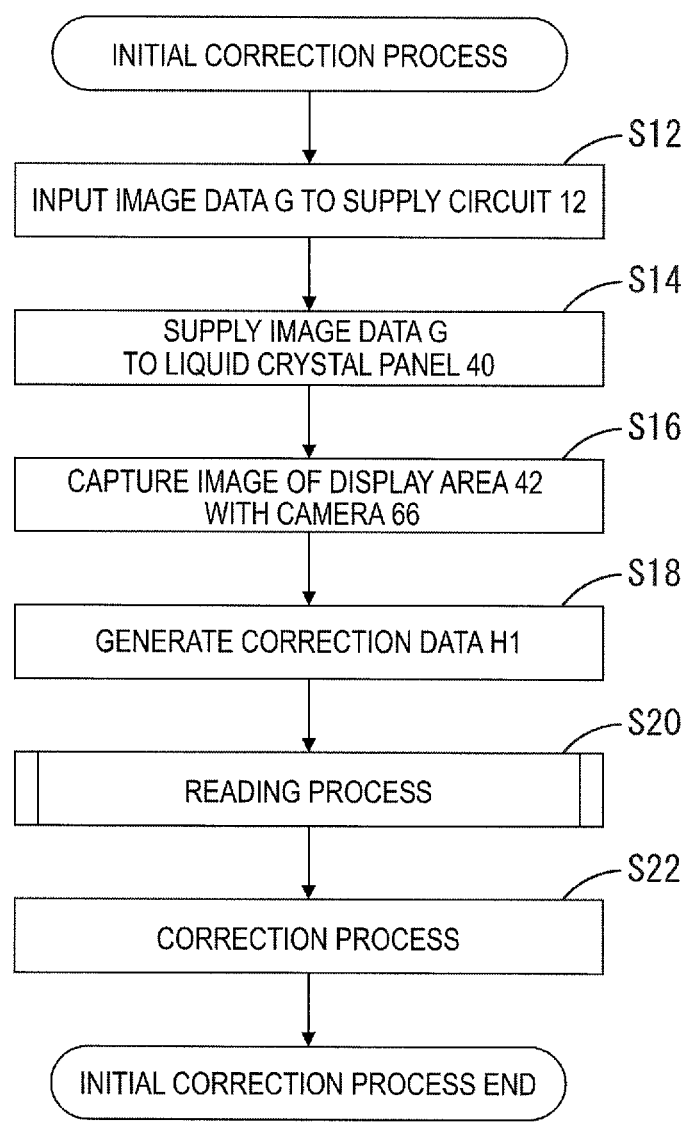
FIG. 4 is a flowchart illustrating an initial correction process.

As illustrated in FIG. 4, in the initial correction process, the computer 64 controls the signal source 62 to input the image data G to the supply circuit 12 (S12). The signal source 62 preliminarily stores image data G for displaying a solid pattern having a reference gradation value. If receiving a command from the computer 64, the signal source 62 transmits the image data G to the supply circuit 12. If receiving the image data G from the signal source 62, the calculation circuit 22 functions as the supplier 32 and supplies the image data G to the liquid crystal panel 40 according to the command from the computer 64 (S14) and display the liquid crystal panel 40. The computer 64 controls the camera 66 to capture an image of the display area 42 of the liquid crystal panel 40 that displays images thereon (S16) and transmits a captured image result W to the computer 64.

If receiving the captured image result W, the computer 64 functions as the generator 70 and generate correction data H1 based on the captured image result W (S18). The correction data H1 represents correction data that is generated by the computer 64. The captured image result W includes captured image results corresponding to each of the pixels P of the liquid crystal panel 40. The computer 64 detects brightness variation B of the captured image results of the pixels P and generates the correction data H1 corresponding to each pixel P such that the brightness variation B is within a predetermined range KH that is previously stored in the computer 64.

Figure 8:
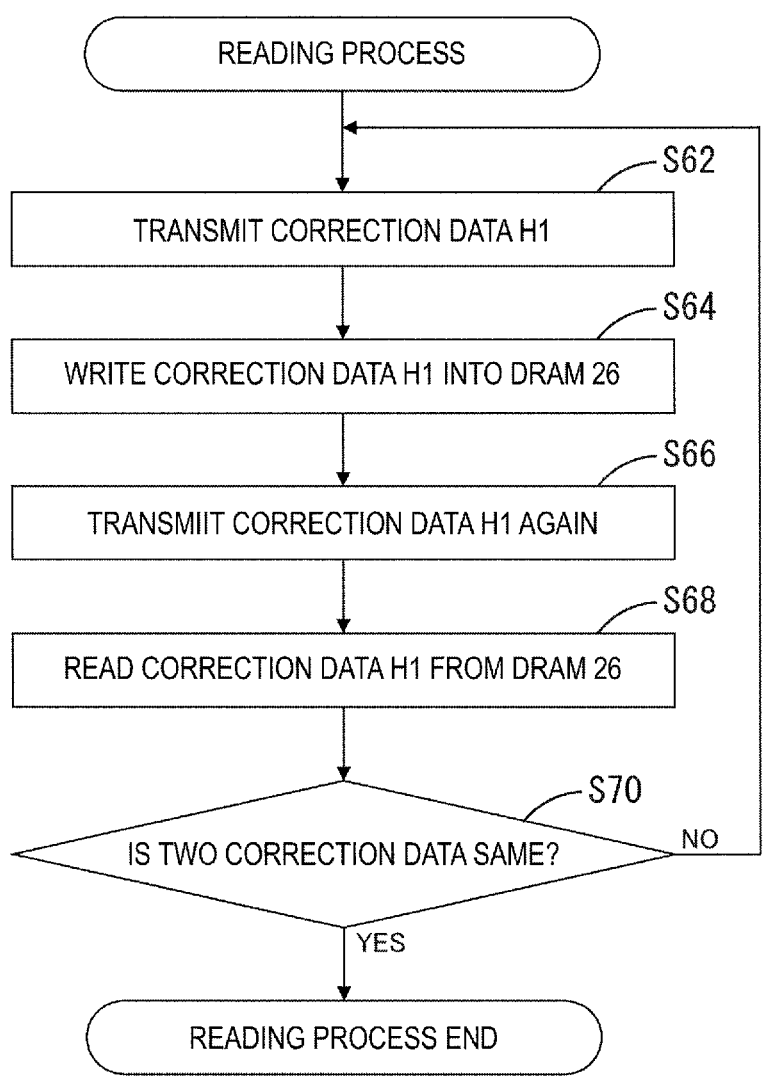
FIG. 8 is a flowchart illustrating a reading process of a first embodiment.

Next, the computer 64 executes a reading process in which the correction data H1 is transmitted from the computer 64 to the supply circuit 12 (S20). As illustrated in FIG. 8, in the reading process, the computer 64 transmits the correction data H1 to the supply circuit 12 (S62). If receiving the correction data H1, the calculation circuit 22 writes the correction data H1 in the DRAM 26 and stores therein (S64).

If a predetermined time that is required for writing the correction data H1 has passed after the previous transmission of the correction data H1, the computer 64 transmits the same correction data H1 to the supply circuit 12 (S66). If receiving the correction data H1, the calculation circuit 22 reads the correction data H1 stored in the DRAM 26 (S68) and compares the correction data H1 that is received again and the correction data H1 read from the DRAM 26 (S70). If the two pieces of correction data H1 are same (S70: YES), the computer 64 terminates the reading process. If the two pieces of correction data H1 are not same (S70: NO), the computer 64 executes the processes from S62 to S70 repeatedly.

Next, the computer 64 executes a correction process (S22). The computer 64 controls the signal source 62 to input image data G to the supply circuit 12. If receiving the image data G, the calculation circuit 22 functions as the corrector 34 and reads the correction data H1 stored in the DRAM 26 and corrects the image data G and generates corrected image data G'. After generating the corrected image data G', the calculation circuit 22 changes the correction data H1 stored in the DRAM 26 to correction data H2 and terminates the initial correction process. The correction data H2 represents correction data that is stored in the DRAM 26 until a next correction process after the current correction process, and represents correction data that is used in the previous correction process.

(Re-correction Process)

After terminating the initial correction process, the computer 64 functions as the controller 72 and executes a re-correction process (S4).

Figure 5:
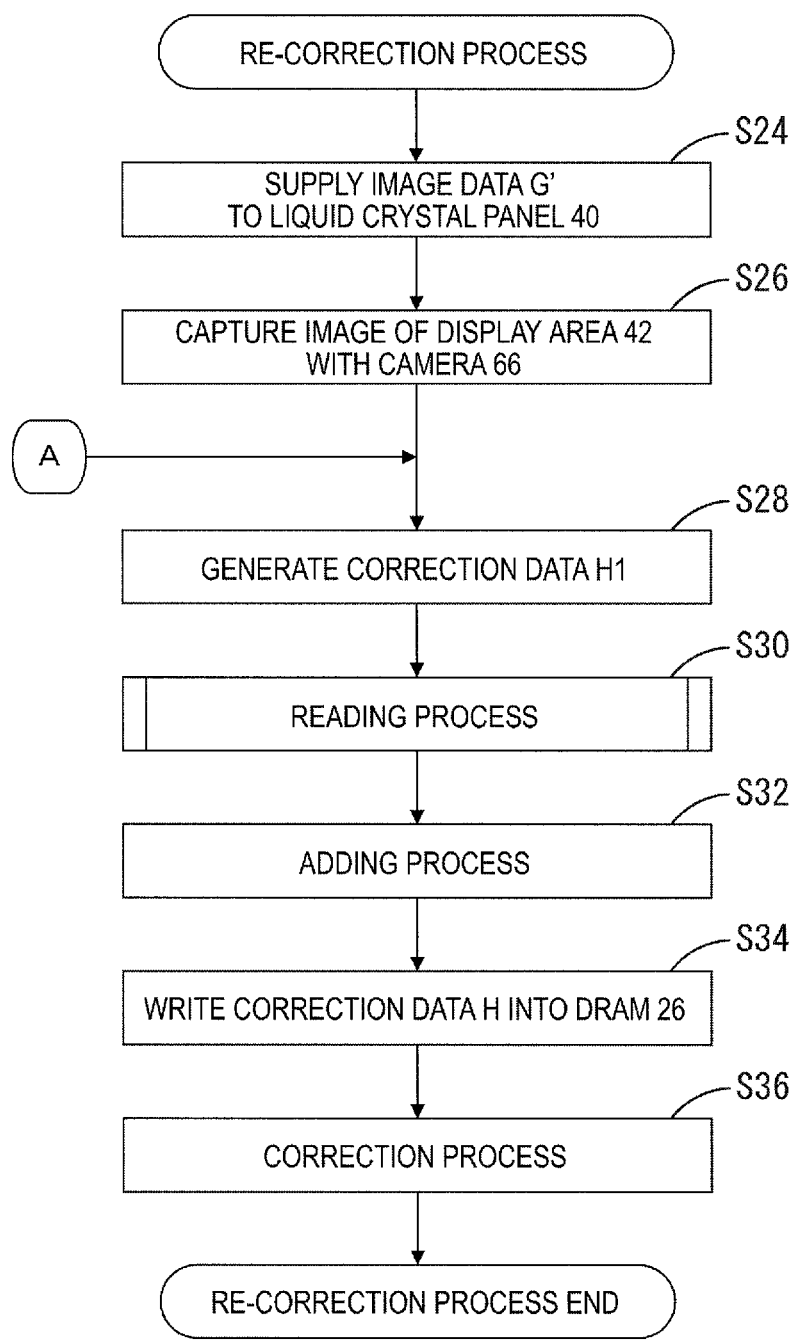
FIG. 5 is a flowchart illustrating a re-correction process.

As illustrated in FIG. 5, in the re-correction process, the computer 64 controls the calculation circuit 22 and displays the liquid crystal panel 40 again. If receiving a command from the computer 64, the calculation circuit 22 functions as the supplier 32 and supplies the corrected image data G' that is generated at S22 to the liquid crystal panel 40 (S24) and displays the liquid crystal panel 40 again. The computer 64 captures an image of the display area 42 of the liquid crystal panel 40 that is displaying (S26) and transmits the captured image result W' to the computer 64.

The computer 64 generates new correction data H1 from the captured image result W' (S28) and transmits the correction data H1 to the supply circuit 12 (S30). The processes (S28, S30) of the re-correction process are same as the processes (S18, S20) of the initial correction process, and the same explanation thereof will be omitted. After execution of the reading process (S30) for receiving the correction data H1, the calculation circuit 22 executes an adding process (S32). The calculation circuit 22 reads the two pieces of correction data H1, H2 stored in the DRAM 26 and adds the two pieces of correction data H1 and H2 to generate correction data H. The calculation circuit 22 writes the generated correction data H into the DRAM 26 and stores it in the DRAM 26 (S34).

correction data $H$=correction data $H1$+correction data $H2$

The correction data H is obtained by adding the newly generated correction data H1 to the correction data H2 that is used in the previous correction process and thus, the correction data H is newly generated. The correction data H is obtained by adding the correction data H1 to the correction data H2 such that the display unevenness that is not corrected by the correction data H2 can be corrected by the correction data H. This improves precision of correction compared to the correction made with the correction data H2.

Next, the computer 64 executes a correction process (S36). The computer 64 controls the signal source 62 and inputs image data G to the supply circuit 12. If receiving the image data G, the calculation circuit 22 functions as the corrector 34. The calculation circuit 22 that functions as the corrector 34 reads the correction data H stored in the DRAM 26 and corrects the image data G and generates corrected image data G" and terminates the re-correction process. The corrected image data G" is generated by using the correction data H that is generated again and the corrected image data G" is the corrected image data that is generated again.

(Determination Process)

After terminating the re-correction process, the computer 64 executes a determination process (S6).

Figure 6:
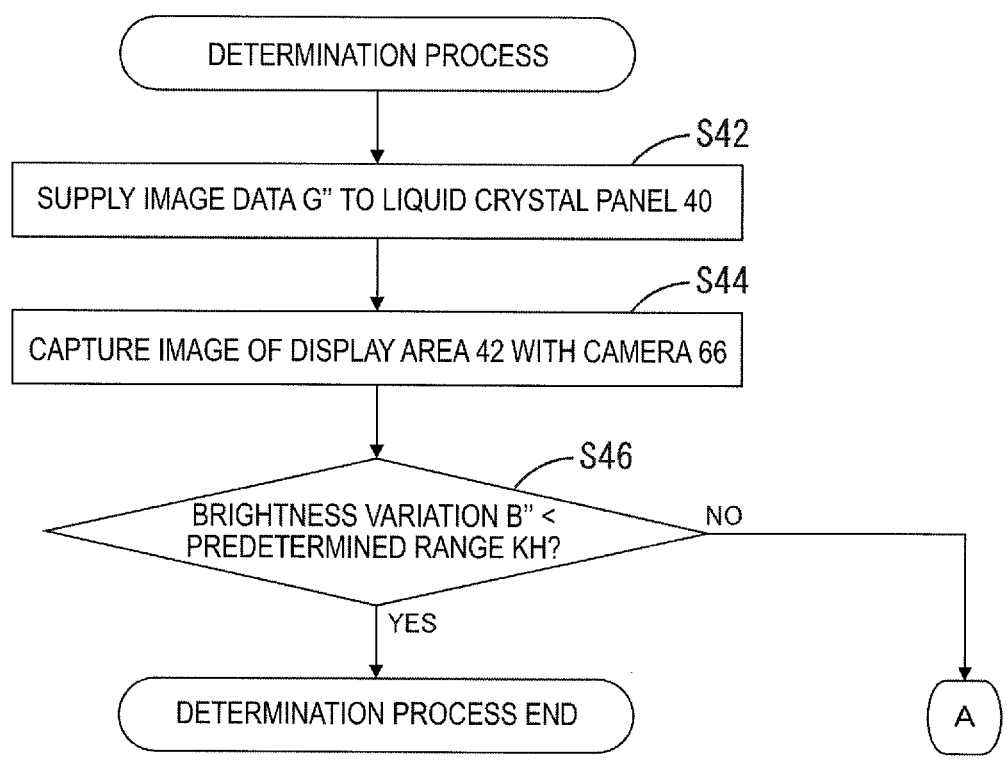
FIG. 6 is a flowchart illustrating a determination process.

As illustrated in FIG. 6, in the determination process, the computer 64 controls the calculation circuit 22 and displays the liquid crystal panel 40 again. If receiving a command from the computer 64, the calculation circuit 22 functions as the supplier 32 and supplies the corrected image data G" that is generated at S36 to the liquid crystal panel 40 (S42) and displays the liquid crystal panel 40 again. The computer 64 captures an image of the display area 42 of the liquid crystal panel 40 that is displaying (S44), and transmits the captured image result W" to the computer 64.

If receiving the captured image result W", the computer 64 detects brightness variation B" of the captured image result W" and compares the detected brightness variation B" to the predetermined range KH (S46). If determining that the detected brightness variation B" is within the predetermined range KH (S46: Yes), the computer 64 terminates the determination process. In such a case, the computer 64 deletes the correction data H and H1 from the DRAM 26. If determining that the detected brightness variation B" is greater than the predetermined range KH (S46:No), the computer 64 interrupts the determination process and returns to the re-correction process to execute again the processes from S28.

In returning to the re-correction process, the computer 64 controls the calculation circuit 22 and deletes the correction data H1 and H2 from the DRAM 26. The computer 64 changes the correction data H stored in the DRAM 26 to the correction data H2. After returning to the re-correction process, the computer 64 starts the process with using the captured image result W" captured at S44 as the captured image result W' captured at S26. Namely, after returning to the re-correction process, the computer 64 executes the process from S28 again without executing the processes of S24 and S26. Therefore, in the determination process and the subsequent re-correction process, the same correction image data G" is not displayed and captured repeatedly.

(Storing Process)

After terminating the determination process, the computer 64 executes a storing process (S8).

Figure 7:
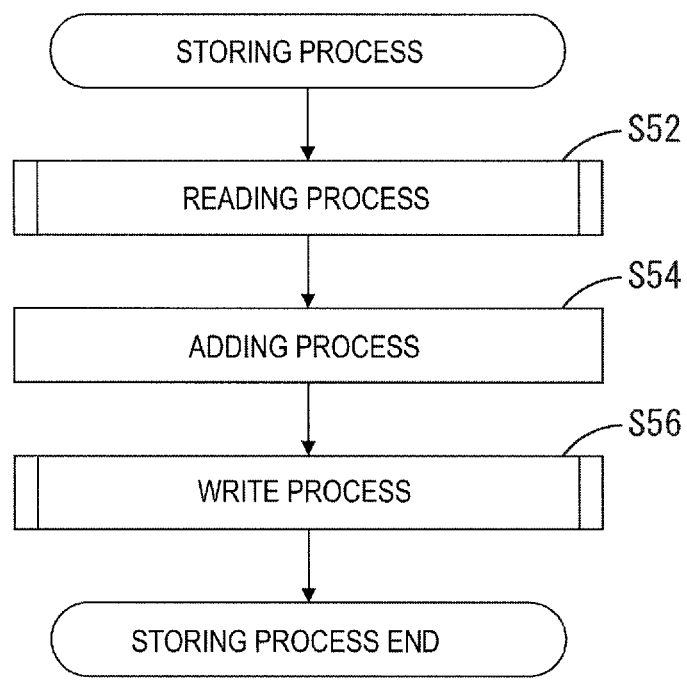
FIG. 7 is a flowchart illustrating a storing process.

As illustrated in FIG. 7, in the storing process, the computer 64 transmits the correction data H1 to the supply circuit 12 (S52) and executes the adding process (S54). The processes (S52, S54) of the storing process are same as the processes (S30, S32) of the re-correction process. The same explanation thereof will be omitted.

Figure 9:
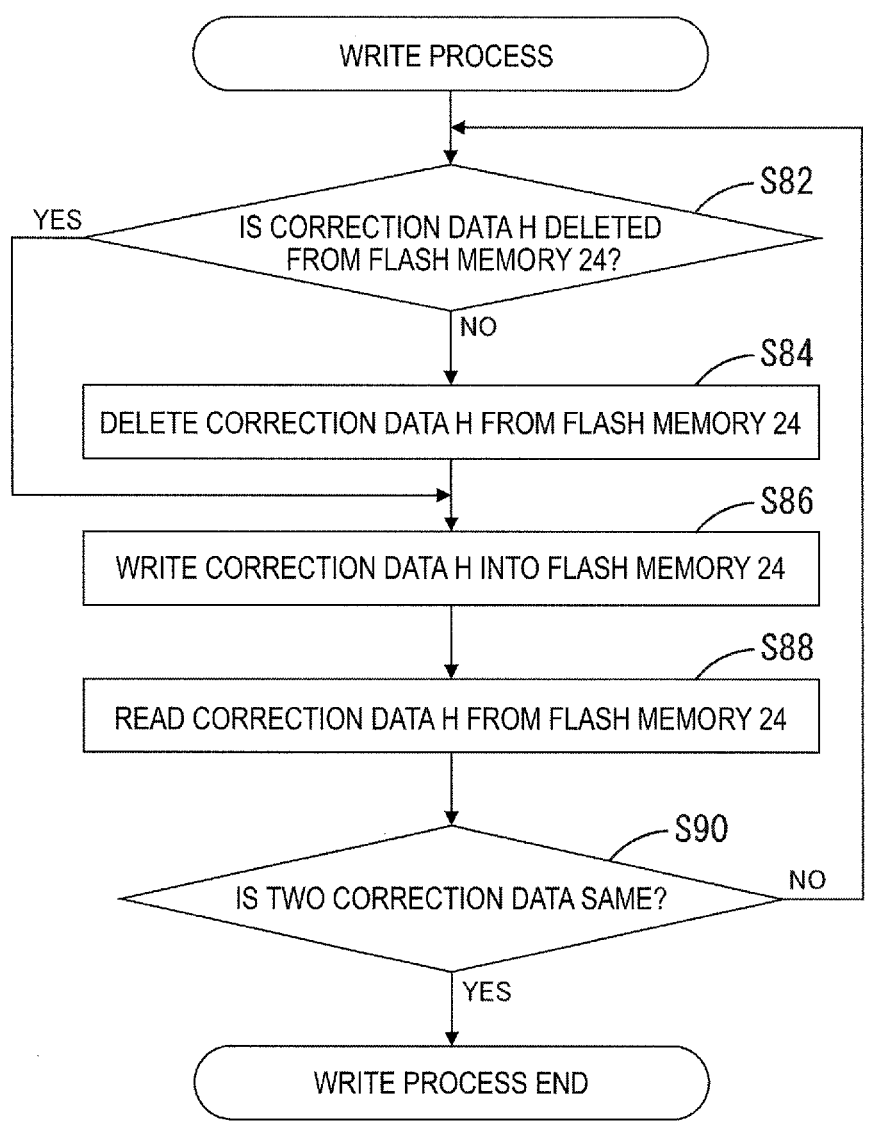
FIG. 9 is a flowchart illustrating a writing process.

Next, the computer 64 controls the calculation circuit 22 and executes a writing process in which the correction data H is written in the FLASH memory 24 (S56). As illustrated in FIG. 9, in the writing process, according to the command from the computer 64, the calculation circuit 22 confirms whether the correction data H is deleted from the FLASH memory 24 or not (S82). If determining that the correction data H is deleted from the FLASH memory 24 (S82: No), the calculation circuit 22 writes the correction data H generated at S54 into the FLASH memory 24 and stores it in the FLASH memory 24 (S86). If determining that the correction data H is already written in the FLASH memory 24 (S82: No), the calculation circuit 22 deletes the written correction data H (S84) and thereafter writes the correction data H generated at S54 into the FLASH memory 24 and stores it in the FLASH memory 24 (S86).

If terminating the writing of the correction data H into the FLASH memory 24, the calculation circuit 22 reads the correction data H stored in the FLASH memory 24 (S88) and compares the correction data H read from the FLASH memory 24 and the correction data H stored in the DRAM 26 (S90). If it is determined that the two pieces of correction data H are same (S90: Yes), the computer 64 terminates the writing process and terminates the process. If it is determined that the two pieces of correction data are different from each other (S90: No), the computer 64 repeats the processes from S82 to S90.

3. Advantageous Effects of Correction System (1) According to the process executed by the correction system 1 of the present embodiment, the processes from the process of capturing an image of the displaying liquid crystal panel 40 with the camera 66 to the process of displaying again the corrected image data G' that is generated based on the captured image result W on the liquid crystal panel 40 (S15-S24, S26-S42) are repeatedly executed. During the execution of the processes, the correction data H (H1, H2) is stored in the DRAM 26 that is a volatile storing device. According to the correction system 1, the DRAM 26 is used as the storing device that stores the correction data H, and this shortens time required for executing the processes.

FIG. 10 illustrates time required for the processes of the present embodiment. FIG. 11 illustrates time required for the correction process if a non-volatile storing device is used for the processes from the process of acquiring the captured image result W to the process of displaying again the liquid crystal panel 40.

FIGS. 10 and 11 illustrate total time required if the processes from the process of acquiring the captured image result W to the process of displaying again the liquid crystal panel 40 are repeated twice and also illustrate time required for one cycle of the processes after the second cycle. The correction data H is supposed to be data of approximately 4 M bits. Namely, it is supposed that approximately 2000 times of writing operations are required for writing into the FLASH memory 24.

As illustrated in FIGS. 10 and 11, according to the present embodiment, the time required for writing in and reading from the FLASH memory 24 of a related art is replaced with the time required for writing in and reading from the DRAM 26. This shortens time required for the process of writing and reading. Similarly, the time required for deleting from and writing in the FLASH memory 24 of a related art is replaced with the time required for deleting from and writing in the DRAM 26. This shortens time required for the process of deletion and writing. Therefore, in the correction process of the present embodiment, even if the processes from the process of acquiring the captured image result W to the process of displaying again the liquid crystal panel 40 are repeatedly executed, the time required for the processes is less likely to be long.

(2) In the process executed by the correction system 1 according to the present embodiment, the process of generating correction data H is executed for a plurality of times. In acquiring the captured image result W, noise may occur in the camera 66, or an image capturing error may be caused by a filter attached to the camera 66. In generating the correction data H based on the captured image result W, a calculation error may occur. A technology such as data compression may be required for generating correction data of a large volume such as approximately 4 M bits, and this may cause a calculation error. Namely, the correction data H that is generated based on the captured image result W via an appropriate process may have an error. Therefore, the display unevenness of the liquid crystal panel 40 may not corrected precisely by the correction data H that is obtained via one cycle of the generation process.

(3) In the processes executed by the correction system 1 according to the present embodiment, after the re-correction process, the correction data H1 that is generated based on a most recent captured image result W and the correction data H2 that is stored in the DRAM 26 and used in the previous correction process are added up together to generate the correction data H. The correction process is executed with using the correction data H. Thus, the correction data H of high precision is generated by synthesizing a plurality of correction data H that is generated by a plurality of generation operations, and accordingly, the display unevenness of the liquid crystal panel 40 is corrected precisely.

(4) In the reading process executed by the correction system 1 according to the present embodiment, the same correction data H1 is transmitted from the computer 64 to the supply circuit 12 twice, and the calculation circuit 22 to which the correction data H is input determines if a plurality of correction data H1 is same. Namely, the calculation circuit 22 executes a verifying operation. The verifying operation is executed in the device to which certain data is input. Therefore, if a communication error occurs in transmission of the correction data from the computer 64 to the supply circuit 12, the corrected image data G' is less likely to be generated based on the correction data H generated with the occurrence of the communication error. Accordingly, the display unevenness of the display panel is precisely corrected.

(5) According to the correction system 1 of the present embodiment, the image data G and the correction data H is input to the supply circuit 12 via the same input line 18. Even if the correction data H is transmitted via the input line 18 to which data having a predetermined transmission direction such as the image data G is input, a transmission error is detected. Accordingly, the display unevenness of the liquid crystal panel 40 is precisely corrected.

<Second Embodiment>

Figure 12:
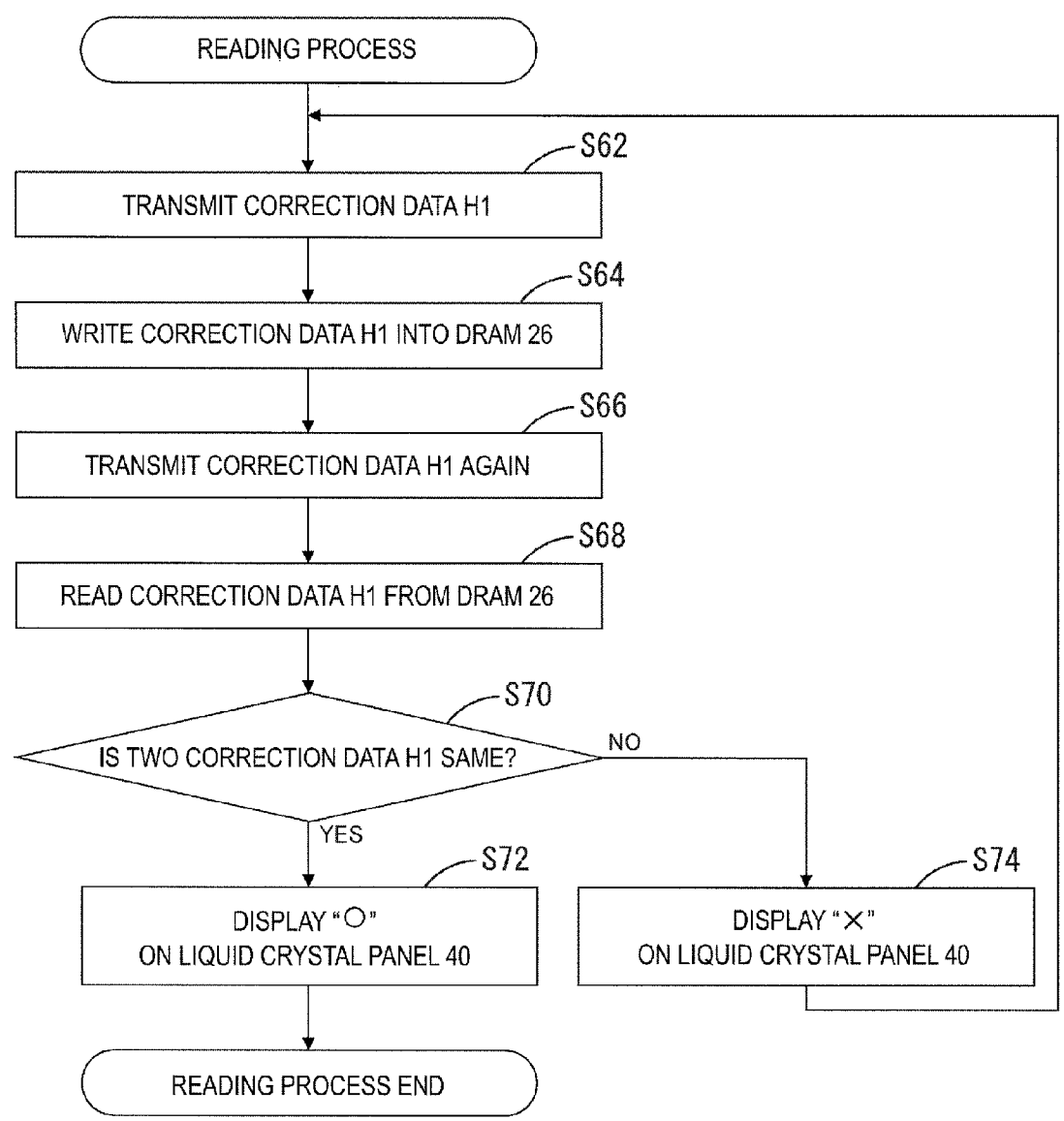
FIG. 12 is a flowchart illustrating a reading process of a second embodiment.

A second embodiment will be explained with reference to FIG. 12. Unlike the first embodiment, in the correction system 1 of the present embodiment, the FLASH memory 24 of the supply circuit stores identification image data (one of examples of identification mark) K that informs occurrence of a transmission error between the computer 64 and the supply circuit 12. In the following explanation, the description same as that in the first embodiment will be omitted.

1. Process of Correction System

In the reading process, if receiving the correction data H1 at S62 and S66 that are set to be at different timing, the calculation circuit 22 compares the two correction data H1 (S70). If it is determined that the two correction data H1 is same (S70: Yes), as illustrated in FIG. 12, the calculation circuit 22 reads the identification image data K for displaying "○" among the identification image data K stored in the FLASH memory 24. The identification image "○" represents that the two pieces of correction data H1 are same. The read identification image data K is output to the liquid crystal panel 40 via the supply line 20 (S72). As a result, "○" is displayed on the liquid crystal panel 40.

If it is determined that the two pieces of correction data H1 are different from each other (S70: No), the calculation circuit 22 reads the identification image data K for displaying "X" among the identification image data K stored in the FLASH memory 24. The identification image "X" represents that the two pieces of correction data H1 are different from each other. The read identification image data K is output to the liquid crystal panel 40 via the supply line 20 (S74). As a result, "X" is displayed on the liquid crystal panel 40.

The computer 64 captures an image of the display area 42 of the liquid crystal panel 40 that displays an identification image and transmits the captured image result W' to the computer 64. The computer 64 confirms the captured image result W'. If detecting that the captured image result W' includes "○", the computer 64 terminates the reading process. If detecting that the captured image result W' includes "X", the computer 64 repeats the processes from S62 and supplies the correction data H1 to the supply circuit 12 again.

2. Advantageous Effects of Correction System (1) The calculation circuit 22 of the present embodiment compares the two pieces of correction data H1 that are received at different timing, and outputs corresponding identification image data K to the liquid crystal panel 40 via the supply line 20 according to the comparison result. Namely, the calculation circuit 22 outputs the determination result representing whether the two pieces of correction data H1 are same or not with using the identification image data K. Therefore, the supply line 20 through which the image data G and the corrected image data G' is supplied to the liquid crystal panel 40 functions as an output line through which the determination result is output.

(2) According to the correction system 1 of the present embodiment, an identification image is displayed on the liquid crystal panel 40 and accordingly, the computer 64 detects the identification image with using the camera 66 and detects that a transmission error occurs between the computer 64 and the supply circuit 12. If detecting that the transmission error occurs, the computer 64 further supplies the correction data H1 to the supply circuit 12 such that the corrected image data G' is less likely to be generated based on the correction data H1 that is input at the occurrence of the transmission error.

<Third Embodiment>

A third embodiment will be explained with reference to FIG. 13. Unlike the first embodiment, according to the correction system 1 of the present embodiment, as illustrated with a dotted line in FIG. 1, the computer 64 stores a plurality of conversion patterns C with which the correction data H1 input from the computer 64 to the supply circuit 12 is converted. In the following explanation, description same as that in the first embodiment will be omitted.

1. Process of Correction System

Figure 13:
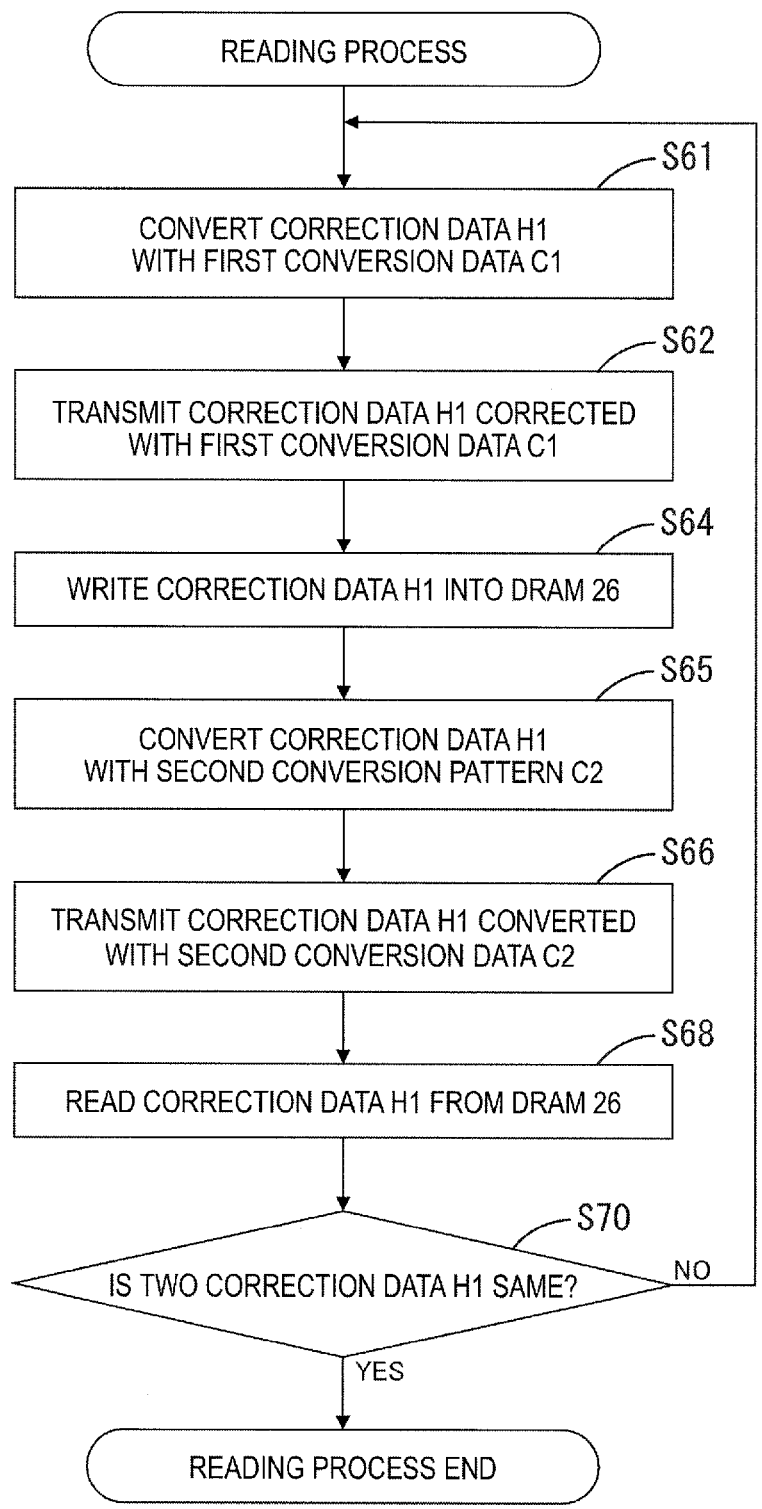
FIG. 13 is a flowchart illustrating a reading process of a third embodiment.

In the reading process, as illustrated in FIG. 13, the computer 64 converts the correction data H1 with a first conversion pattern C1 (S61) prior to input of the correction data H1 to the supply circuit 12 in S62, and inputs the converted correction data H1 to the supply circuit 12. Prior to the input of the correction data H1 to the supply circuit 12 at S66, the correction data H1 is converted with a second conversion pattern C2 that is different from the first conversion pattern C1 (S65) and the converted correction data H1 is input to the supply circuit 12. If receiving the correction data H1 at S62 and S66, the calculation circuit 22 compares the two pieces of correction data H1 (S70). The calculation circuit 22 converts again the correction data H1 that is received at S62 based on the first conversion pattern C1. The calculation circuit 22 converts again the correction data H1 that is received at S66 based on the second conversion pattern C2. The calculation circuit 22 compares the two pieces of converted correction data H1 and determines if the two pieces of converted correction data H1 are same.

2. Advantageous Effects of Correction System

According to the calculation circuit 22 of the present embodiment, the computer 64 stores a plurality of conversion patterns C. The calculation circuit 22 converts the correction data H1 input to the supply circuit 12 with using the conversion pattern C, and this improves accuracy of detecting a transmission error that may occur between the computer 64 and the supply circuit 12.

As an example of a transmission error occurring between the computer 64 and the supply circuit 12, disconnection of the input line 18 may occur. If disconnection occurs in the input line 18, the correction data H1 including all signals representing "0" or "1" is input to the supply circuit 12. Therefore, the calculation circuit 22 that receives such correction data H1 that is not correct data determines erroneously that no transmission error occurs, because the correction data H1 that is received at different timing is same.

In the correction system 1 of the present embodiment, when the correction data H1 is input to the supply circuit 12, the computer 64 converts the correction data H1 with using the first conversion pattern C1 and the second conversion pattern C2 that are different from each other. The calculation circuit 22 converts again the received correction data H1 with using the conversion patterns C and determines whether the converted plurality of correction data H1 are same. Therefore, even if the plurality of correction data H1 is same when the calculation circuit 22 receives the correction data H1, the plurality of correction data H1 that are converted again may not be same. In such a case, a transmission error is detected and this improves accuracy of detecting a transmission error.

<Other Embodiments>

The present invention is not limited to the above embodiments described in the above description and the drawings. The following embodiments are also included in the technical scope of the present invention, for example.

(1) In the above embodiments, the reading process is executed in the storing process, the initial correction process, and re-correction process. However, the present invention is not limited thereto. The reading process may be executed only in the storing process. This further shortens time required for processes executed by the correction system 1.

(2) In the above embodiments, the correction data H is generated based on the brightness variation B of the captured image result W and it is determined whether the determination process is terminated or not. However, the present invention is not limited thereto. The process may be executed based on the brightness variation B of the captured image result W and also chromaticity variation.

(3) In the above embodiments, each of the calculation circuit 22 and the DRAM 26 is provided independently. However, the DRAM 26 may be provided in the calculation circuit 22. In such a case, the process of writing the correction data H in the DRAM 26 is an internal process of the calculation circuit 22, and this further shortens time required for the processes executed by the correction system 1.

(4) In the above embodiments, in the reading process, the determination result that represents whether the correction data H1 received at different timing is same or not is output to the supply line 20. However, the present invention is not limited thereto. The determination result may be output to a connection line that is connected to a serial communication bus such as I2C separately from the supply line 20. In such a case, the data output as the determination result may not be limited to the identification image data K but may be modified if necessary.

If the identification image data K is output to the liquid crystal panel 40 via the supply line 20, the identification image may not be necessarily "◯" and "X". Further, the identification image is not necessarily image data. For example, the identification image may be a process that can be recognized by the camera 66 such as lowering brightness of the backlight unit 50.

(5) In the above embodiments, the LED is used as the light source. However, a light source other than the LED may be used.

EXPLANATION OF SYMBOLS

1: Correction system, 10: Liquid crystal display device, 12: Supply circuit, 14: Display, 18: Input line, 20: Supply line, 22: Calculation circuit, 24: FLASH memory, 26: DRAM, 32: Supplier, 23: Corrector, 40: Liquid crystal panel, 42: Display area, 62: Signal source, 64: Computer, 66: Camera, 70: Generator, 72: Controller, B: Brightness variation, G: Image data, G', G": Corrected image data, H, H1, H2: Correction data, KH: Predetermined range, W: Captured image result, C: Conversion pattern, K: Identification image data

The invention claimed is:

1. A correction system for correcting display unevenness of a display panel, the correction system comprising:
   a supplier configured to supply image data to the display panel and display the display panel;
   an image capturing device configured to capture an image of a display area of the display panel;
   a generator configured to generate correction data for the display panel based on a captured image result obtained by the image capturing device;
   a first storing device that is volatile and configured to store the correction data;
   a corrector configured to correct the image data with using the correction data stored in the storing device and generate corrected image data; and
   a controller configured to control each component so as to generate another correction data again based on a captured image result obtained when the corrected image data is supplied to the display panel to display the display panel, and to generate another corrected image data based on the another correction data; wherein
   the generator inputs the generated correction data to the corrector, and the generator inputs same correction data several times when inputting the correction data to the corrector, and
   the corrector determines whether the correction data input several times at different timing coincide with each other.

2. The correction system according to claim 1, wherein the generator inputs the image data to the corrector via an input line and the generator inputs the correction data to the corrector via the same input line.

3. The correction system according to claim 1, wherein the corrector is configured to be connected to an output line via which a determination result regarding the correction data is output.

4. The correction system according to claim 3, wherein the output line is commonly used as a supply line via which the corrected image data is supplied to the display panel,
   the corrector has an identification mark representing the determination result and outputs the identification mark to the display panel according to the determination result, and
   if it is determined that the captured image result includes an identification mark representing that the correction data does not coincide with each other, the generator inputs the correction data to the corrector again.

5. The correction system according to claim 1, wherein
   the generator has a plurality of conversion patterns with which the correction data is converted, and
   in inputting the same correction data to the corrector for a plurality of times, the generator inputs the correction data that is converted with at least two of the conversion patterns to the corrector.

6. The correction system according to claim 1, further comprising a second storing device that is non-volatile and configured to store the correction data, wherein
   the controller controls the display to display the other corrected image data on the display panel and controls the image capturing device to capture an image of the other corrected image data after generation of the other correction data and the other corrected image data and obtains a captured image result, if variation of the captured image result is greater than a predetermined range, the controller controls the generator and the corrector to generate an additional corrected image data based on the captured image result, if the variation of the captured image result is within the predetermined range, the other correction data is input to the corrector several times.

\* \* \* \* \*